(12) United States Patent
Das Sharma

(10) Patent No.: US 7,054,985 B2
(45) Date of Patent: May 30, 2006

(54) MULTIPLE HARDWARE PARTITIONS UNDER ONE INPUT/OUTPUT HUB

(75) Inventor: Debendra Das Sharma, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 394 days.

(21) Appl. No.: 10/200,247

(22) Filed: Jul. 23, 2002

(65) Prior Publication Data
US 2004/0019728 A1    Jan. 29, 2004

(51) Int. Cl.
G06F 13/28 (2006.01)
G06F 13/26 (2006.01)
G06F 13/36 (2006.01)

(52) U.S. Cl. .................. 710/306; 710/22; 710/310; 709/221

(58) Field of Classification Search ........ 710/306, 710/310, 22; 709/221
See application file for complete search history.

(56) References Cited

U.S. PATENT DOCUMENTS

| | | | | |
|---|---|---|---|---|
| 5,117,350 A | * | 5/1992 | Parrish et al. ............. | 711/1 |
| 5,243,273 A | * | 9/1993 | McAuliffe et al. .......... | 714/724 |
| 6,067,603 A | * | 5/2000 | Carpenter et al. .......... | 711/141 |
| 6,081,874 A | * | 6/2000 | Carpenter et al. .......... | 711/141 |
| 6,101,181 A | * | 8/2000 | Passint et al. .............. | 370/352 |
| 6,105,053 A | * | 8/2000 | Kimmel et al. ............. | 718/105 |
| 6,334,177 B1 | * | 12/2001 | Baumgartner et al. ....... | 712/13 |
| 6,484,272 B1 | * | 11/2002 | Egolf et al. ................. | 714/30 |
| 6,675,223 B1 | * | 1/2004 | Corl et al. .................. | 709/238 |
| 6,760,786 B1 | * | 7/2004 | Hagersten .................... | 710/5 |
| 6,769,021 B1 | * | 7/2004 | Bradley ...................... | 709/220 |
| 2002/0032850 A1 | * | 3/2002 | Kauffman ..................... | 712/31 |

* cited by examiner

*Primary Examiner*—Rehana Perveen
*Assistant Examiner*—Christopher Daley

(57) ABSTRACT

A method and a mechanism are capable of partitioning computer hardware components or elements at the level of individual processing paths, or ropes. Incoming and outgoing queues may be designed such that transactions to/from one rope do not interfere with another rope. Each common queue is treated as a collection of virtual queues/buffers. Transaction generated by computer system components may include both the address and the partition identification (ID) of the component. This ensures that components of one partition cannot adversely affect components of another partition, or the entire computer system. The computer components include input/output (I/O) devices, such as ethernet cards, or other I/O devices. The method and mechanism may be adapted for use by computer components other than I/O devices.

6 Claims, 6 Drawing Sheets

MULTIPLE HARDWARE PARTITIONS UNDER ONE INPUT/OUTPUT HUB

TECHNICAL FIELD

The technical field is computer systems having multiple and/or redundant subsystems and components.

BACKGROUND

Current multi-processor computer systems are typically partitioned such that hardware and software resources of the computer system are divided among the various partitions. For example, in a multi-processor computer system, the processors may be divided into two or more groups of processors. Other resources, such as memory buses, for example, may be included in the processor partitions.

Coherent input/output (I/O) hub chips with a cache or I/O translation look aside buffer (TLB) can be shared among multiple I/O paths. Current solutions assume all ropes under a same cache belong to one partition. Current systems also put an entire I/O hub in one partition. This causes too many resources (I/O cards and connections, for example) to be locked into one partition.

SUMMARY

A method and a mechanism are described herein that are capable of fine-grain partitioning of computer resources. In particular, multiple I/O paths, or ropes, are partitioned with each rope potentially belonging to a different partition in the computer system. In an embodiment, incoming and outgoing queues are designed such that transactions to/from one rope do not interfere with another rope. Each common queue is treated as a collection of virtual queues/buffers. The components are input/output (I/O) devices, such as ethernet cards, or other I/O devices. However, the method and mechanism may be adapted for use by computer components other than I/O devices.

Coherent I/O chips with a cache or TLB can be shared among multiple ropes, each rope potentially belonging to a different partition. Earlier solutions assumed all ropes under the cache to belong to the same partition. In an embodiment, multiple partitions coexist under one cache, making the granularity of the partitions low.

DESCRIPTION OF THE DRAWINGS

The detailed description will refer to the following figures, in which like numbers refer to like elements, and in which.

DETAILED DESCRIPTION

A method and a mechanism are described herein that are capable of partitioning computer hardware components or elements at the level of individual processing paths, or ropes. In an embodiment, incoming and outgoing queues are designed such that transactions to/from one rope do not interfere with another rope. Each common queue is treated as a collection of virtual queues/buffers. The computer components include input/output (I/O) devices, such as ethernet cards, or other I/O devices. However, the method and mechanism may be adapted for use by computer components other than I/O devices.

Figure 1:
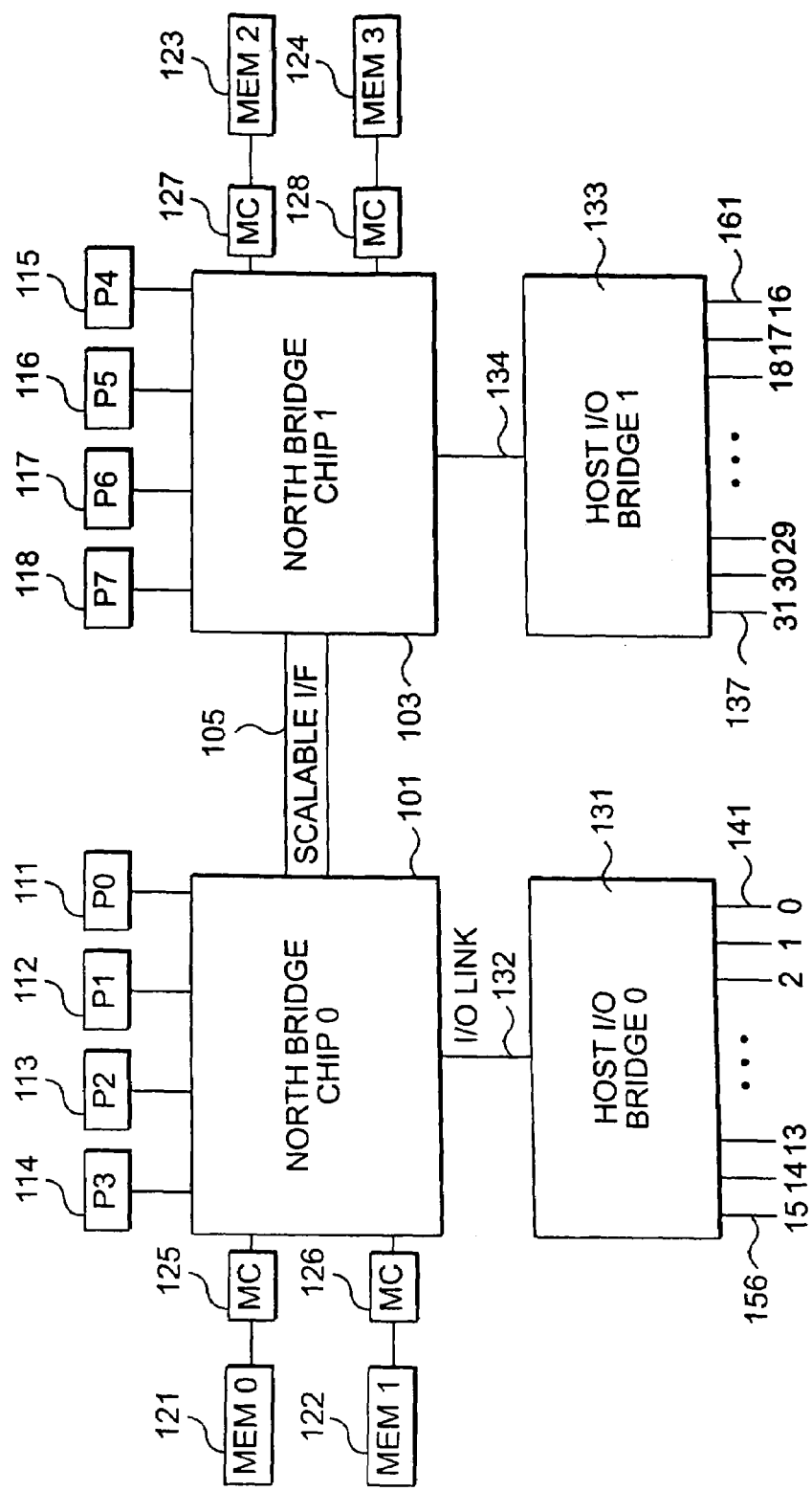
FIG. 1 is a diagram of a computer architecture employing multiple/redundant components.

FIG. 1 is a block diagram of an exemplary computer architecture 100 that uses multiple hardware partitions under one I/O hub to provide fine grain partitioning. The architecture 100 includes north bridge chips 101 and 103 coupled together by scalable interface 105. Coupled to the north bridge chip 101 are processors 111–114 and memory buses 121 and 122. Coupled to the north bridge chip 103 are processors 115–118 and memory buses 123 and 124. The memory buses 121–124 may operate under control of memory controllers 125–128.

Each north bridge in the architecture 100 may be connected to a host I/O bridge through an I/O link or system bus interface. As shown in FIG. 1, the north bridge 101 connects to host I/O bridge 131 through I/O link 132, and the north bridge chip 103 connects to host I/O bridge 133 through I/O link 134. Coupled to the host I/O bridge 131 are sixteen ropes, 141–156. Coupled to the host I/O bridge 133 are another sixteen ropes 161–176. The configuration of computer components or elements of the architecture 100 shown in FIG. 1 is by way of example only, and the architecture 100 could include more or less of each of the components shown.

Figure 2:
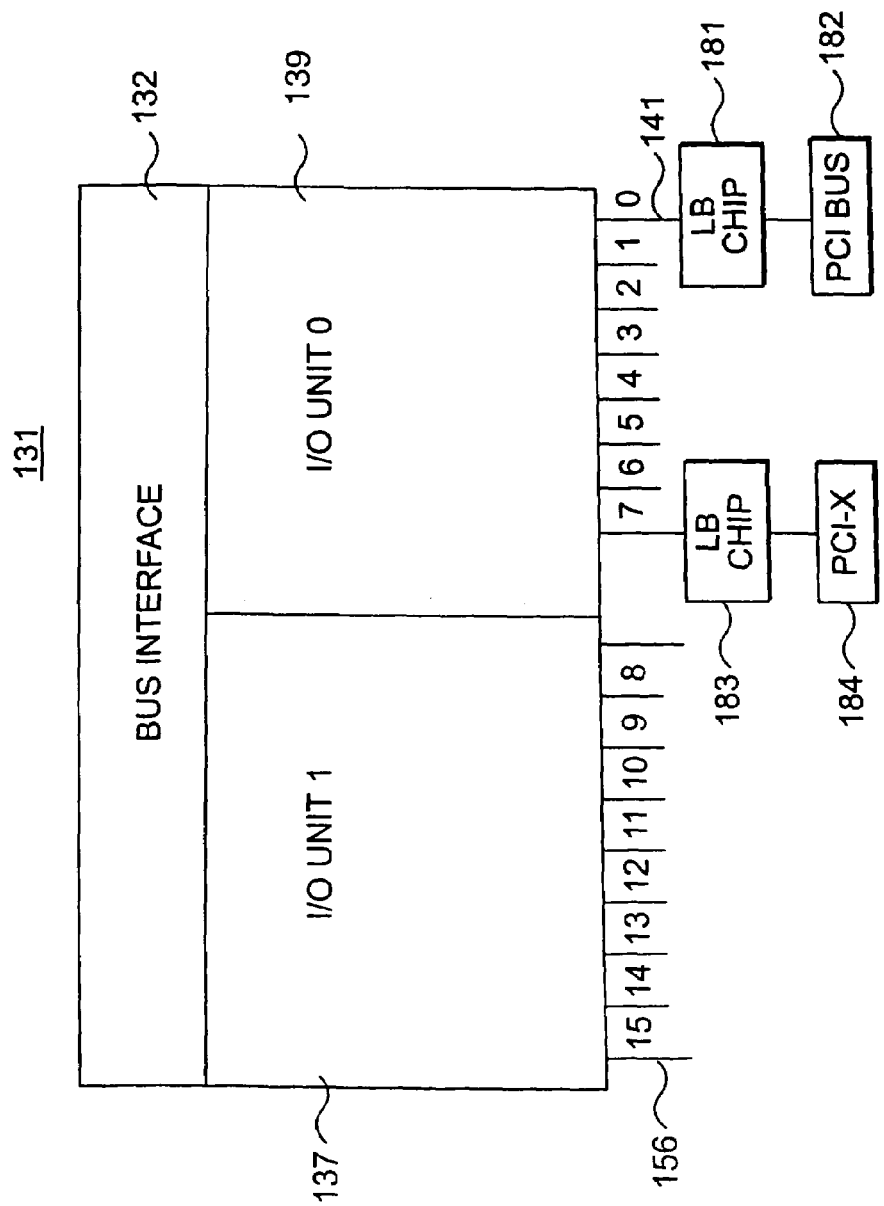
FIG. 2 is a diagram of host I/O bridge used in the computer architecture of FIG. 1.

FIG. 2 is a block diagram of a host I/O bridge, such as the host I/O bridge 131 shown in FIG. 1. The host I/O bridge 131 is shown with the I/O link, or system bus interface 132. The host I/O bridge 131 may include one or more I/O units, such as I/O units 137 and 139. The I/O units 137 and 139 may control or include various other computer components, such as cache, translation lookaside buffers (TLBs), queues, registers, and control elements. The sixteen ropes coupled to the host I/O bridge 131 may be partitioned among the I/O units 137 and 139 as shown. The individual ropes 141–156 may connect to other computer components. Each such rope may operate under control of a rope controller (not shown). In the example shown in FIG. 2, the rope 141 (rope 0) connects to lower bus chip 181, which in turn connects to PCI bus 182. The ropes 147 and 148 (ropes 7 and 8) connect to lower bus chip 183, which in turn connects to PCI-X bus 184. Other ropes illustrated in FIG. 2 may connect to other computer components.

Figure 3:
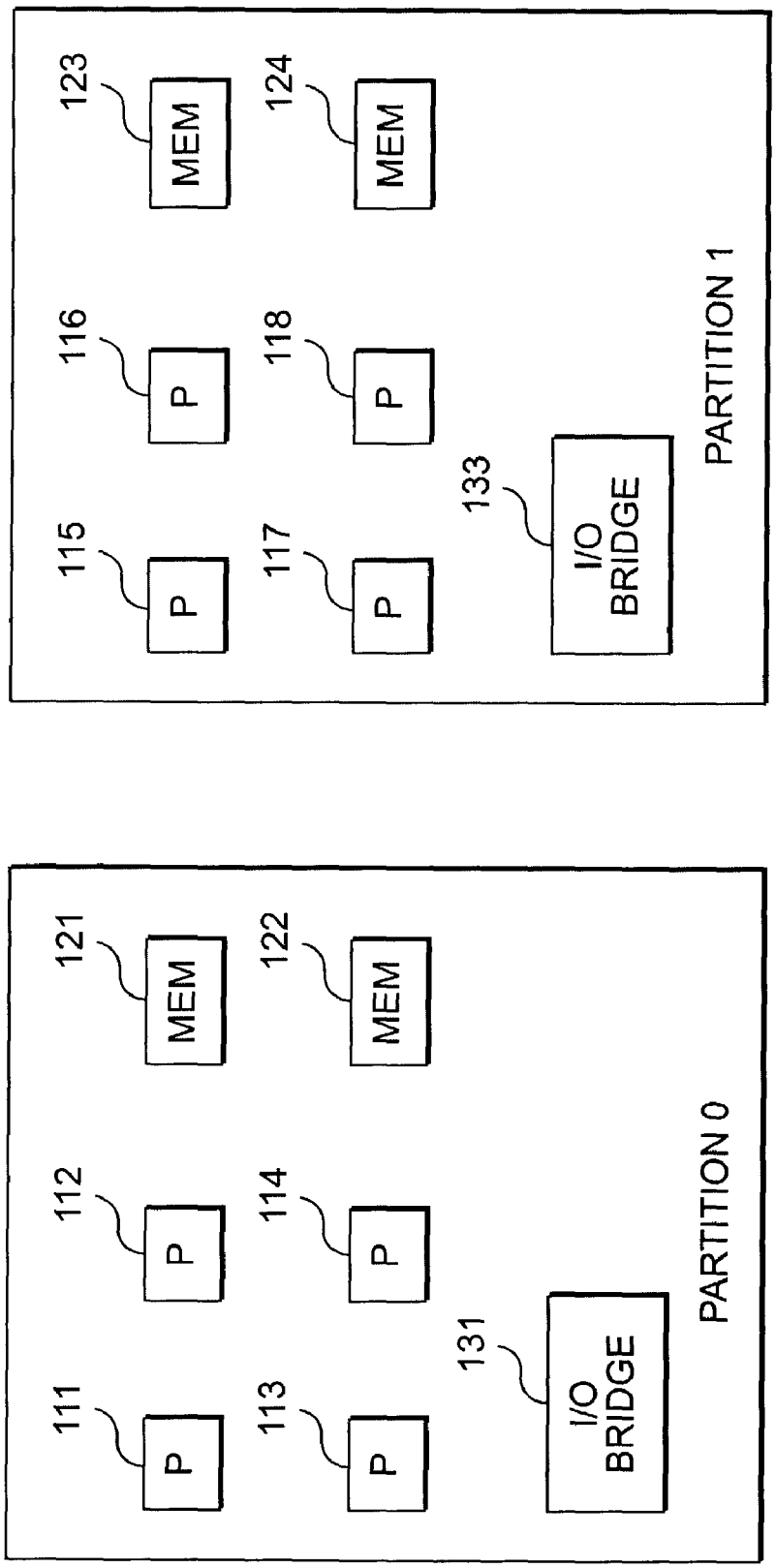
FIG. 3 illustrates a possible partitioning scheme to be used with the architecture of FIG. 1.

The various computer components shown in FIGS. 1 and 2 may be partitioned. Partitioning may be accomplished in software and hardware. FIG. 3 shows one such partitioning scheme. In the examples shown, the computer components may be partitioned in hardware into two partitions, with partition 0 comprising processors 111–114, memory buses 121 and 122, and host I/O bridge 131. Partition 1 may include processors 115–118, memory buses 123 and 124, and host I/O bridge 133. Such partitioning is an example of what may be termed coarse-grain partitioning, and the various components within each of the partitions 0 and 1 are strictly segregated so that no sharing of components occurs across the partition boundaries. Moreover, the partitioning is defined at a coarse level, such as the host I/O bridge level, and individual ropes connected to the host I/O bridge are not explicitly included in the partitioning scheme. In other words, all ropes connected to a particular host I/O bridge are included within the same partition as that of the host I/O bridge. Similarly, all processors (and cores within processors having multiple cores) may be included in the same partition as that of the connected north bridge chip, for example.

In an alternative partitioning scheme (not shown), or fine grain partition, sharing of some computer components is allowed. For example, the minimum compute granularity may be at the processor (or core within the processor) level; memory may be allocated in pages, and I/O resources may be allocated down to the granularity of a rope. This fine grain partitioning provides advantages in terms of computer performance and cost reductions, but requires mechanisms and methods to ensure that the individual partitions do not interfere with each other.

Figure 4:
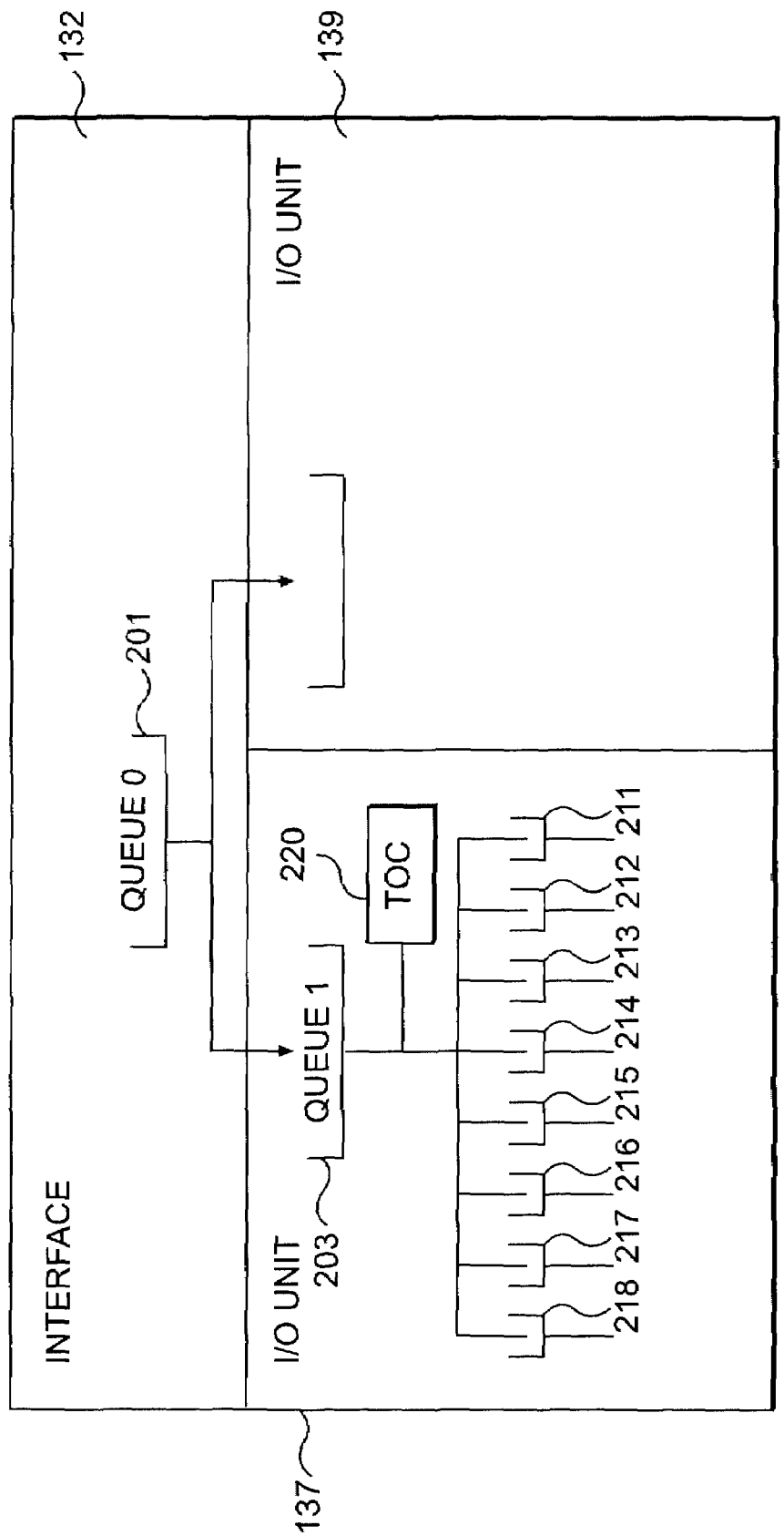
FIG. 4 is a diagram of a system of queues used to prevent interference of one partition by another partition.

FIG. 4 illustrates mechanisms to prevent partition interference by guaranteeing forward progress of data in queues. The host I/O bridge 131 is shown with outbound common queue 201 (queue 0) at the system bus interface 132. The queue 201 may feed outbound queues 203 and 204. The outbound queue 203 (queue 1), acting as a common queue, may in turn feed outbound queues 211–218 (queues 2–9), with each of the outbound queues 211–218 assigned to a specific rope (i.e., the ropes 149–156), as shown. Should a problem develop with one of the ropes 149–156, for example, the rope 156, such that its outbound queue 218 is not emptying, the upstream, or common queue 203 and the other ropes 149–155 may be affected, and may fail. In addition, other partitions may be adversely affected. To prevent backpressure from the failed rope 156 from adversely affecting other computer components, the common queues 203 and 201 may each be treated as a group of independent queues. For example, the common queue 203 (common to the queues 211–218) may be treated as a group of eight independent queues, one for each of the downstream queues 211–218. In an embodiment, the queue 203 may be internally partitioned with address ranges assigned to each of the queues 211–218. As an alternative to partitioning the common queues, a timeout mechanism 220 may be coupled to the queues 211–218 that will dump the contents of any of the queues 211–218 after a specified time, should the associated rope fail. The embodiments described herein then allow common queues to flow information and data, and prevent backup with possible attendant failure of associated components.

Figure 5:
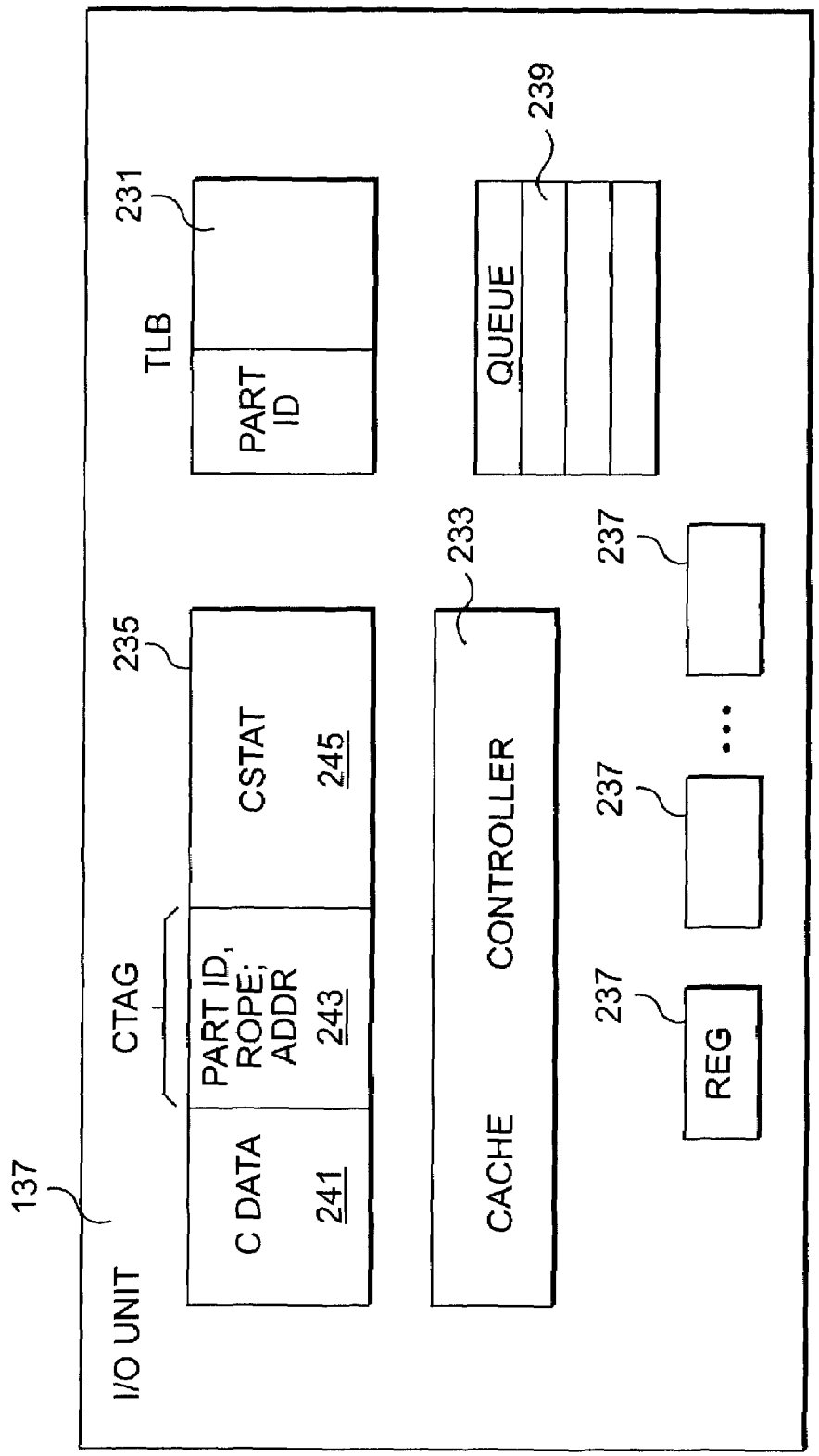
FIG. 5 is a diagram of components of the host I/O bridge of FIG. 2.

FIG. 5 illustrates other mechanisms to prevent partition interference. In FIG. 5, the I/O unit 137 of the host I/O bridge 131 is shown with a partition TLB 231, a cache controller 233, a cache 235, a partition register 237, and a queue 239. The cache 235 includes sections to identify transaction targets, and to provide other information related to specific transactions. As shown, the cache 235 may include a C-data section 241, a C-tag section 243, and a C-stat section 245. The C-data section 241 includes data related to a specific cache line. The C-tag section 243 records address information for a specific cache line. The address information may include a partition ID, a specific rope, and a target address. The C-stat section 245 records information specific to a particular cache line. For example, the C-stat section 245 may indicate that a specific cache line is invalid. The TLB 231, cache controller 233, cache 235, partition register 237, and queue 239 communicate to ensure non-interference of partitions during operation of the computer system represented by the architecture 100 shown in FIG. 1. As noted above, the host I/O bridge 131 (in this example) is assigned to the partition 0. All components of the host I/O bridge 131 may also be assigned to the partition 0. The ropes 149–156 also may be assigned to the partition 0 (coarse-grain partitioning), or the ropes 149–156 may be assigned to other partitions. In an embodiment, each of the ropes 149–156 may be assigned to a unique partition. Each such partition may be identified by a partition ID, which may be a one or two bit data field, for example.

The cache 235 may use a partition ID along with an address of the partition to ensure transactions are sent to the correct component within each partition. For example, when a direct memory access (DMA) read (or write) request comes up a rope, the rope controller generates the partition ID associated with that rope. The address and partition ID are then sent to the cache controller 233. The cache controller 233 uses the partition ID and the address to determine if the requested line is present in the cache 235. If there is a cache miss (i.e., the requested line is not present), the cache controller 233 sends a fetch request to the appropriate memory controller (e.g., for memory buses 121 or 122—see FIG. 1). The fetch request includes the cache line address as well as the partition ID of the rope generating the read (write) request.

A recall request is a transaction initiated by the cache controller 233 when a computer component has control of a cache line, and another component requests the same line. For recall requests, the cache controller 233 compares the requesting component's partition ID along with the address to the lines in the cache 235. The only exception to this rule may be globally shared memory (GSM), or memory that is shared by multiple partitions. In one embodiment, the cache controller 233 infers that a <position ID, address> is GSM, and substitutes that partition ID with other partition IDs of the GSM for the recall. In an alternate embodiment, the memory controller generates multiple recalls, with each such recall having a partition ID for all partitions belonging to the GSM.

For interrupts or non-coherent memory reads (writes) the same partition ID gets attached. For processor I/O writes or reads, the check is done to see if the processor belongs to the partition of the rope the processor is writing to. For cache flushes or I/O TLB purges, either a trusted processor or a processor of the partition is allowed to flush lines (or purge TLB entries). Thus, for example, only the processors 111–114 (see FIG. 1) are allowed to purge entries in the I/O TLB 231 since the processors 111–114 (in this example) are assigned to partition 0, as is the host I/O bridge 131 (see FIG. 1). This ensures another partition (e.g., the partition 1) does not flush cache lines (or purge TLB entries) belonging to partition the partition 0 (or any other partition of the computer architecture 100.

Figure 6:
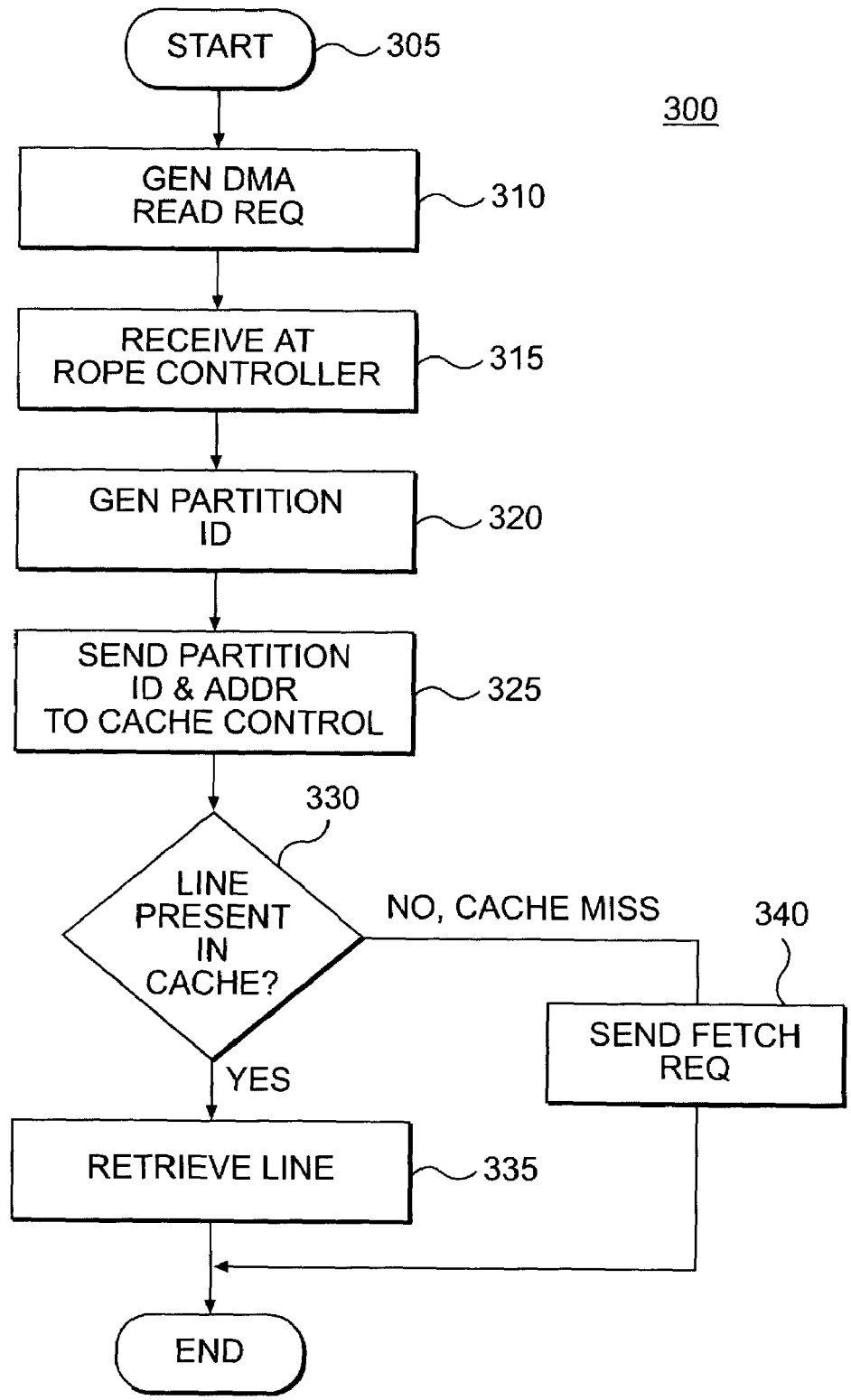
FIG. 6 is a flowchart illustrating an operation of the computer architecture of FIG. 1.

FIG. 6 is a flowchart illustrating a direct memory access (DMA) read operation 300 initiated by a component coupled to one of the processing paths (ropes) of FIG. 1. The operation 300 begins a block 305. In block 310, a component associated with rope 156 generates a DMA read request. In block 315, the read request is received at the rope controller for the rope 156. In block 320, the rope controller generates a partition identification for the partition associated with the rope 156. In block 325, the rope controller then sends the address and the partition ID to the cache controller 233. The cache controller 233 determines if the cache line is present in the cache 235, block 330. If the cache controller 233 determines that the line is present in the cache 235, the cache controller 233 retrieves the requested line from the cache 235, block 335. If the cache controller 233 determines that a cache miss has occurred, the cache controller 233 send a fetch request to the appropriate memory controller, block 340. The fetch request includes the cache line address and the partition ID. Following either block 335 or 340, the read operation 300 ends.

The invention claimed is:

1. An apparatus for partitioning hardware in a computer system, the computer system including a plurality of input/output (I/O) paths, each of the I/O paths coupled to a host input/output (I/O) bridge, wherein at least one partition encompasses the plurality of I/O paths, the apparatus comprising:
    a hierarchy of outbound queues, comprising:
        a lowest hierarchy of lowest outbound queues, wherein a lowest outbound queue in the lowest hierarchy of outbound queues is assigned to a unique I/O path,
        a plurality of higher levels of higher outbound queues, wherein a higher outbound queue in the plurality of higher levels of outbound queues comprises a plurality of virtual queue sections, wherein each lowest outbound queue receives data from and sends data to a specified one of the one or more virtual queue sections; and
    an I/O path controller that assigns a partition identification (ID) to transactions originating on a specific I/O path, the partition ID corresponding to a partition in which the specific I/O path is assigned.

2. The apparatus of claim 1, further comprising a cache in the host I/O bridge, the cache comprising a partition ID section.

3. The apparatus of claim 2, wherein the host I/O bridge comprises a cache controller, wherein the cache controller compares address information and partition ID for read/write requests for requests not directed to globally shared memory.

4. The apparatus of claim 3, wherein the cache controller infers a partition ID and address for requests directed to globally shared memory.

5. The apparatus of claim 1, further comprising a translation lookaside buffer (TLB), the TLB comprising a partition ID section, wherein the partition ID of the specific I/O path is recorded.

6. The apparatus of claim 1, wherein the host I/O bridge includes a plurality of registers, wherein one or more of the plurality of registers is accessed by an operating system of a partition, wherein components of other partitions are denied access to the one or more of the plurality of registers.

* * * * *